United States Patent
Hashizume et al.

(10) Patent No.: US 6,806,322 B2
(45) Date of Patent: Oct. 19, 2004

(54) HYDROGENATED STYRENE POLYMER, PROCESS FOR PRODUCING THE SAME, AND MOLDED OBJECT OBTAINED THEREFROM

(75) Inventors: Kiyonari Hashizume, Yamaguchi (JP); Nobuaki Kido, Yamaguchi (JP); Shunichi Matsumura, Yamaguchi (JP); Takeshi Sasaki, Yamaguchi (JP)

(73) Assignees: Teijin Limited, Osaka (JP); Bayer AG, Leverkusen (DE)

( * ) Notice: Subject to any disclaimer, the term of this patent is extended or adjusted under 35 U.S.C. 154(b) by 0 days.

(21) Appl. No.: 10/466,278

(22) PCT Filed: Jan. 16, 2002

(86) PCT No.: PCT/JP02/00217
§ 371 (c)(1),
(2), (4) Date: Jul. 15, 2003

(87) PCT Pub. No.: WO02/057324
PCT Pub. Date: Jul. 25, 2002

(65) Prior Publication Data
US 2004/0054094 A1 Mar. 18, 2004

(30) Foreign Application Priority Data
Jan. 17, 2001 (JP) ........................................ 2001-008424

(51) Int. Cl.[7] .............................. C08F 8/04; C08F 6/12
(52) U.S. Cl. .................... 525/333.3; 525/338; 525/940; 528/502 A; 528/503; 428/64.4
(58) Field of Search .............................. 525/333.3, 338, 525/940; 528/502 A, 503; 428/64.4; 369/288

(56) References Cited

U.S. PATENT DOCUMENTS 4,911,966 A * 3/1990 Murayama et al. ........ 428/65.1
6,486,262 B1 * 11/2002 Suzuki et al. ............ 525/332.9

FOREIGN PATENT DOCUMENTS

| JP | 61-90345 | 5/1986 |
|----|----------|--------|
| JP | 6-199950 | 7/1994 |
| JP | 7-114030 | 12/1995 |
| WO | WO 99/05210 | 2/1999 |

OTHER PUBLICATIONS

Patent Abstracts of Japan No 63-043910 dated Feb. 25, 1998.

* cited by examiner

*Primary Examiner*—Fred Teskin
(74) *Attorney, Agent, or Firm*—Sughrue Mion, PLLC

(57) ABSTRACT

The present invention relates to a hydrogenated styrene polymer that has excellent transparency, can be used suitably for an optical application such as an optical disk substrate, has stability and transparency in a hot and humid environment, and has excellent heat resistance; and a process for producing same; etc. The hydrogenated styrene polymer of the present invention has a hydrogenated polymerized styrene unit content of at least 70 wt %, a content of fine particulate foreign matter having a particle size of 0.2 $\mu$m or more and less than 0.5 $\mu$m of at most $1 \times 10^6$ per g of the hydrogenated styrene polymer, and a phosphorus atom content of at most 0.01 parts by weight in 100 parts by weight of the hydrogenated styrene polymer. Furthermore, the process for producing a hydrogenated styrene polymer of the present invention includes steps of filtering, with a filter having a pore size of 0.3 $\mu$m or less, a hydrogenated styrene polymer having a hydrogenated polymerized styrene unit content of at least 70 wt %, at a temperature at which the solution viscosity thereof is at most 10 Pa·sec (100 poise) at a shear rate of 1 (1/s), and then removing a solvent from the filtrate thus obtained.

4 Claims, No Drawings

HYDROGENATED STYRENE POLYMER, PROCESS FOR PRODUCING THE SAME, AND MOLDED OBJECT OBTAINED THEREFROM

TECHNICAL FIELD

The present invention relates to a hydrogenated styrene polymer; a process for producing same; etc.

More particularly, it relates to a hydrogenated styrene polymer that has excellent transparency, can be used suitably for an optical application such as an optical disk substrate, and has excellent stability, transparency in a hot and humid environment, and heat resistance; and also relates to a process for producing same; etc.

BACKGROUND ART

Hydrogenated styrene polymers can generally be produced by hydrogenating a styrene polymer, and there have been a large number of proposals for the application of hydrogenated styrene polymers to optical disks such as compact disk (CD) and digital versatile disk (DVD) by utilizing the optical characteristics of the hydrogenated styrene polymers.

For example, JP-B-7-114030 (JP-B denotes a Japanese examined patent application publication) discloses an optical disk comprising a substrate formed from a hydrogenated polystyrene resin having a vinyl cyclohexane content of 80 wt % or higher. It is described therein that, as an optical disk material, this resin has desirable properties since it has high light transmittance, and the birefringence and the water absorption thereof are very low compared with a polycarbonate resin.

With regard to applications other than optical disks, for example, JP-A-6-199950 (JP-A denotes a Japanese unexamined patent application publication) discloses a hydrogenated styrene polymer having a low content of low molecular weight components, and the utilization thereof in medical equipment, electrically insulating materials, and electronic component processing equipment.

In order to improve drawbacks of such resins, the use of a hydrogenated styrene-conjugated diene block copolymer in an optical application such as an optical disk substrate has previously been disclosed, the copolymer being incorporated with a rubber component by block copolymerization of a conjugated diene such as isoprene or butadiene with styrene.

On the other hand, JP-A-61-90345 discloses that, in an optical application, the content of fine particulate foreign matter having a size of 0.5 µm or more should not exceed a certain specific range.

Furthermore, WO 99/05210 discloses that a composition comprising a hydrogenated styrene polymer and an organic high molecular weight compound or an alcoholic ether or ester compound, which are incompatible with the polymer, can suppress cloudiness even in a hot and humid environment. However, there is no description of the cause of the cloudiness, and the mechanism by which cloudiness is prevented in such a composition is unclear.

In recent years, as a result of the development of blue lasers, next-generation high-density optical disks employing blue lasers have been intensively developed. The pit and land/groove sizes of these substrates are smaller still than those of the conventional CD, DVD, etc. More particularly, in the case of CD-ROM, a 780 nm laser is used and the track pitch is 1.6 µm, in the case of DVD-ROM, a 650 nm laser is used and the track pitch is 0.8 µm, and in the case of a next-generation high-density ROM type optical disk, a laser on the order of 400 nm is used and the track pitch is 0.4 µm or less.

As described in JP-A-61-90345, the conventional optical disk substrates only require the control of foreign matter with a size of on the order of 0.5 µm or more, but in the case of the high-density optical disks for blue lasers, it is expected that foreign matter that is smaller than the above value will greatly affect the S/N ratio, etc. of a signal. However, there has so far been no disclosure in relation to the evaluation and control of the amount of foreign matter from such a viewpoint.

The present inventors have found that, when a molding formed from a hydrogenated styrene polymer is used in a high temperature and high humidity atmosphere, spots on the order of a few µm to a few of tens of µm (here, called 'crazing spots' due to the appearance of the spots) appear in the entire body of the molding, and seem to be attributable to a decomposed polymer and/or a decomposed stabilizer.

The occurrence of such spots makes it difficult for the molding to be used as an optical material in a high temperature and high humidity atmosphere. In particular, in the case where it is used as an optical disk substrate, if such a defect occurs within the substrate to even the slightest extent, the S/N ratio of the optical disk substrate is significantly degraded, thereby markedly reducing the commercial value.

DISCLOSURE OF INVENTION

An object of the present invention is to provide a hydrogenated styrene polymer that has excellent heat resistance and is stable in a hot and humid environment and, in particular, in which the occurrence of crazing spots, which cause degradation of transparency in a hot and humid environment, is suppressed; a process for producing the hydrogenated styrene polymer; etc.

Another object of the present invention is to provide a hydrogenated styrene polymer that is suitable for use in an optical application such as an optical disk substrate and, in particular, an optical disk substrate for a blue laser, a container for food or medical use, a film, and a molding such as an electric/electronic component; a process for producing the hydrogenated styrene polymer; etc.

As a result of an investigation by the present inventors into the causes of crazing spots, which result in the degradation of transparency, it has been found that the content of fine particulate foreign matter having a size of 0.2 µm or more and less than 0.5 µm and the phosphorus atom content in the polymer greatly contribute to the occurrence of crazing spots, and controlling the contents of such foreign matter and phosphorus atoms to within specific ranges can provide a hydrogenated styrene polymer in which crazing spots are suppressed.

It has also been found that an optical disk substrate for a blue laser formed using such a hydrogenated styrene polymer gives very few errors, and the present invention has thus been accomplished.

That is, the present invention is a hydrogenated styrene polymer having a hydrogenated polymerized styrene unit content of at least 70 wt %, a content of fine particulate foreign matter having a particle size of 0.2 µm or more and less than 0.5 µm of at most $1\times10^6$ particles per g of the hydrogenated styrene polymer, and a phosphorus atom content of at most 0.01 parts by weight in 100 parts by weight of the hydrogenated styrene polymer.

Furthermore, the present invention is a molding obtained by melt molding such a hydrogenated styrene polymer.

Moreover, the present invention is a process for producing a hydrogenated styrene polymer comprising filtering, with a filter having a pore size of 0.3 μm or less, a hydrogenated styrene polymer having a hydrogenated polymerized styrene unit content of at least 70 wt %, at a temperature at which the solution viscosity thereof is at most 10 Pa·sec (100 poise) at a shear rate of 1 (1/s), and then removing a solvent from the filtrate thus obtained.

PREFERRED MODES FOR CARRYING OUT THE INVENTION

The hydrogenated styrene polymer of the present invention has an aromatic ring-hydrogenated polymerized styrene unit content of at least 70 wt %.

The 'styrene polymer' referred to in the present invention means a styrene homopolymer and a styrene copolymer, and the 'hydrogenated styrene polymer' referred to in the present invention means a hydrogenated styrene homopolymer and a hydrogenated styrene copolymer.

The hydrogenated styrene polymer of the present invention is in a broader sense a hydrogenated vinyl aromatic hydrocarbon polymer. The vinyl aromatic hydrocarbon referred to here means a compound obtained by substituting, with a vinyl group or an ethylenically unsaturated group, one hydrogen atom bonded to an aromatic ring of an aromatic hydrocarbon (benzene, naphthalene, etc.), which may have a substituent (an alkyl group having 1 to 4 carbons, an aryl group having 6 to 10 carbons, etc.).

Specific examples of the styrene polymer used for aromatic ring hydrogenation include a vinyl aromatic hydrocarbon polymer formed from polystyrene, α-methylstyrene, 4-methylstyrene, 3-methylstyrene, 2-methylstyrene, etc., either singly or as a mixture of two or more types. Among these polymers one in which, using a polystyrene component, the polymerized styrene unit content after hydrogenation is at least 70 wt % and at most 99 wt % is preferred in terms of polymer physical properties after hydrogenation and cost. The content is particularly preferably at least 80 wt % and at most 97 wt %, and more preferably at least 82 wt % and at most 96 wt %.

When two or more types of vinyl aromatic hydrocarbons are used in combination, the content of the vinyl aromatic hydrocarbons in the hydrogenated styrene polymer is defined as the wt % of the entire amount of the hydrogenated vinyl aromatic hydrocarbon polymer.

With regard to other components that can form the hydrogenated styrene polymer used in the present invention, a hydrogenated conjugated diene polymer, for example, a hydrogenated polymer of isoprene, 1,3-butadiene, 2,3-dimethyl-1,3-butadiene, 1,3-pentadiene, 1,3-hexadiene, 1,3-cyclohexadiene, etc. can be cited. Among these polymers, a hydrogenated polymer of isoprene or 1,3-butadiene is preferred in terms of polymerizability and economy. They can be used singly or in a combination of two or more types.

Furthermore, such a hydrogenated conjugated diene polymer is preferably contained in the hydrogenated styrene polymer at at least 1 wt % and at most 30 wt % in order to prevent crazing spots from being generated. It is surmised that introduction of such a copolymer component improves the toughness of the hydrogenated styrene polymer, thus preventing crazing spots from being generated. When taking into consideration such toughness, or heat resistance, which will be described later, the content of the copolymer component is more preferably at least 3 wt % and at most 20 wt % as the proportion by weight after hydrogenation, and yet more preferably at least 4 wt % and at most 18 wt %.

The hydrogenated styrene polymer can have a straight-chain structure without branches or a star-shaped branched structure formed from a core and branched chains extending as straight chains from the core.

With regard to the straight-chain structure without branches, a structure in which a hydrogenated diene polymer component (b) is sandwiched by hydrogenated polymerized styrene units (a) (a-b-a structure) is preferred in terms of maintaining the transparency. In this structure, a phase separation of the wavelength of light or less can be easily realized. With regard to a process for producing a copolymer having the straight-chain structure, a conventionally known production process can be employed, and it can be produced by carrying out living anionic polymerization of the polymerized styrene unit (a), the conjugated diene polymer component (b), and the polymerized styrene unit (a) in that order, then stopping the reaction, and carrying out a hydrogenation reaction. From the viewpoint of improving mechanical properties such as impact resistance, it is desirable for as much of the conjugated diene derived component to be included as possible, but if too much is included, coagulation and crystallization easily occur, thus undesirably degrading the transparency as well as the heat resistance.

The copolymer having the star-shaped branched structure formed from a core and branched chains extending as straight chains from the core referred to here has at least three straight-chain polymers bonded to the core site via one end group of each of the polymers. The number of branched chains extending from the core depends on the type of core used and is at least three, and one having four branched chains can be used desirably in terms of synthesis and physical properties. It is of course possible in theory to obtain a star-shaped polymer having more branched chains by using a core having a higher functionality, but in general the larger the number of branched chains, the harder it is to synthesize.

From the viewpoint of toughness of a molding and moldability, the hydrogenated styrene polymer preferably has a reduced viscosity (this refers to the reduced viscosity in toluene, 0.5 g/dL, 30° C.; the same applies below) of at least 0.2 dL/g and at most 3.0 dL/g. When the reduced viscosity is less than 0.2 dL/g, the toughness of the molding is insufficient, and crazing spots are easily generated. When the reduced viscosity exceeds 3.0 dL/g, the flowability is too low and it is difficult to produce a good molding. The reduced viscosity is therefore preferably at least 0.25 dL/g and at most 1.0 dL/g, and more preferably at least 0.30 dL/g and at most 0.7 dL/g.

From the viewpoint of heat resistance, the hydrogenated styrene polymer of the present invention preferably has a glass transition temperature of 110° C. or higher. Because of this, in the case of the hydrogenated styrene polymer containing the hydrogenated diene polymer component, the content of the hydrogenated conjugated diene polymer is preferably at most 20 wt %. The above glass transition temperature is mainly attributable to the hydrogenated styrene polymer component. When the glass transition temperature is lower than 110° C., the heat resistance is not sufficient, distortion might be caused when removing an injection-molded material from a mold, and when it is used as an optical disk substrate, the heat resistance might be undesirably insufficient. As the optical disk substrate, the higher the glass transition temperature, the more preferable;

a temperature of 120° C. or higher is preferable, and a temperature of 130° C. or higher is more preferable.

In the hydrogenated styrene polymer of the present invention, the content of fine particulate foreign matter having a particle size of 0.2 µm or more and less than 0.5 µm is at most $1\times10^6$ particles per g of the hydrogenated styrene polymer. Such a foreign matter content is a value obtained using a light scattering particle counter in accordance with JIS B 9925. Such a measurement can usually be carried out by dissolving a polymer in a solvent that can dissolve the polymer and measuring the scattering intensity due to the polymer and the scattering intensity due to the foreign matter. In the case of the hydrogenated styrene polymer of the present invention, the measurement is preferably carried out by dissolving it in a hydrocarbon solvent such as toluene or cyclohexane. Examples of the foreign matter include external contaminant foreign matter, catalyst residue, degraded polymer material, and degraded additive. Such foreign matter causes crazing spots to be generated in a hot and humid environment.

The size of the foreign matter is a value that is expressed as a particle size in the above-mentioned measurement, and the absolute value of the size itself can vary slightly depending on the measurement principle and the device, but it is necessary for foreign matter having a size in the range of 0.2 µm or more and less than 0.5 µm to be at most $1\times10^6$ particles per g of the polymer. When the content of foreign matter in the range of 0.2 µm or more and less than 0.5 µm exceeds $1\times10^6$ particles per g of the hydrogenated styrene polymer, a large number of crazing spots are generated, and the hydrogenated styrene polymer cannot be used in a hot and humid environment. The smaller the content of foreign matter in the range of 0.2 µm or more and less than 0.5 µm, the more preferable it is; the foreign matter content is preferably at most $5\times10^5$ particles per g of the hydrogenated styrene polymer, more preferably at most $1\times10^5$ particles, yet more preferably at most $8\times10^4$ particles, and yet more preferably at most $5\times10^4$ particles.

Furthermore, it is also preferable for foreign matter having a size of 0.5 µm or more to be present at most $1\times10^5$ particles per g of the hydrogenated styrene polymer, but if the content of the foreign matter in the range of 0.2 µm or more and less than 0.5 µm can be made to be at most $1\times10^6$ particles per g of the hydrogenated styrene polymer, it is possible to make the foreign matter having a size of 0.5 µm or more be at most $1\times10^5$ particles per g of the hydrogenated styrene polymer.

Since the hydrogenated styrene polymer of the present invention is used in melt molding, in order to prevent coloration of the polymer during molding, it is desirable to minimize a residual catalyst metal component in the polymer. The amount of such residual catalyst metal is preferably at most $1\times10^{-3}$ parts by weight as a metal atom relative to 100 parts by weight of the hydrogenated styrene polymer, and more preferably at most $1\times10^{-4}$ parts by weight.

In the case where the hydrogenated styrene polymer of the present invention is produced by anionic polymerization, a compound of a metal of group I or II in the periodic table such as lithium or sodium, originating from a polymerization initiator, might remain in the polymer, and in this case the residual metal component is preferably at most $2\times10^{-5}$ parts by weight relative to 100 parts by weight of the hydrogenated styrene polymer. When it is present at more than $2\times10^{-5}$ parts by weight, a phenolic hydroxyl group-containing stabilizer, which will be described later, and the residual metal compound undesirably react with each other.

The reaction of the phenolic hydroxyl group with the metal compound causes coloration, resulting in a reduction in light transmittance and, in particular, light transmittance in a short wavelength region. In view thereof, the residual metal compound is preferably at most $1.5\times10^{-5}$ parts by weight as the metal atom, and more preferably at most $1\times10^{-5}$ parts by weight.

The phosphorus atom content is at most 0.01 parts by weight in 100 parts by weight of the hydrogenated styrene polymer of the present invention. Since a phosphorus compound is often polar, the compound itself aggregates in the polymer causing crazing spots, and there is a high possibility that the compound, together with trace amounts of the above-mentioned foreign matter remaining in the polymer, accelerate the generation of crazing spots under hot and humid conditions. The smaller the phosphorus atom content, the more preferable; it is yet more preferable for the phosphorus atom content to be at most 0.005 parts by weight, and yet more preferable for it to be at most 0.001 parts by weight.

From such a viewpoint, in the case where an electron-donating compound, which will be described later, is used, it is preferable to use a compound containing no phosphorus atom, and in the case where a heat stabilizer, which will be described later, is used, it is preferable to use a non-phosphorus stabilizer.

The hydrogenated styrene polymer resin of the present invention is preferably produced in the sequence: polymerization of a styrene polymer, hydrogenation reaction, removal of hydrogenation catalyst and foreign matter, and removal of solvent. The production process of the present invention is now sequentially explained in detail, but the production steps can of course be replaced by conventionally known, equivalent production steps corresponding to each thereof.

With regard to a method for polymerizing a styrene polymer, in the case of a styrene polymer such as polystyrene, which is formed from the aforementioned vinyl aromatic hydrocarbon polymer alone, it can be produced by a conventionally known radical, cationic, or anionic polymerization method. In the case of a styrene polymer containing a conjugated diene polymer component, polymerization can be carried out by a known method such as an anionic polymerization method.

With regard to an initiator for carrying out polymerization using the anionic polymerization method, there can be cited as examples metals of groups I or II in the periodic table and organometallic compounds thereof. Specific examples thereof include lithium, sodium, potassium, rubidium, cesium, francium, magnesium, calcium, strontium, barium, radium, methyllithium, ethyllithium, n-propyllithium, iso-propyllithium, n-butyllithium, iso-butyllithium, sec-butyllithium, cyclopentadienyllithium, phenyllithium, cyclohexyllithium, methylsodium, ethylsodium, n-propylsodium, iso-propylsodium, n-butylsodium, cyclopentadienylsodium, dimethylmagnesium, bis(cyclopentadienyl)magnesium, dimethylcalcium, and bis(cyclopentadienyl)calcium. Among these examples, the organolithium compounds are preferred in terms of availability and operability, and n-butyllithium and sec-butyllithium are particularly preferred. They can be used singly or in a combination of two or more types.

When carrying out anionic polymerization, an electron-donating compound can be added in order to further activate the above-mentioned initiator, thus increasing the reaction rate and the molecular weight and preventing deactivation of anions. The electron-donating compound is a compound that can donate an electron to the metal of the initiator without impairing the function of the initiator, and is a compound containing an oxygen atom, a nitrogen atom, or a sulfur atom. Specific examples thereof include ethers such as furan, tetrahydrofuran, diethyl ether, anisole, diphenyl ether, methyl t-butyl ether, dioxane, dioxolane, dimethoxyethane, and diethoxyethane, tertiary amines such as trimethylamine, triethylamine, tributylamine, tetramethylmethylenediamine, tetramethylethylenediamine, tetraethylmethylenediamine, tetraethylethylenediamine, tetramethyl-1,3-propanediamine, tetramethylphenylenediamine, and diazabicyclo[2,2,2] octane, thioethers such as dimethylsulfide, thiophene, and tetrahydrothiophene, and metal alkoxides such as sodium t-butoxide, sodium phenoxide, potassium t-butoxide, and potassium phenoxide. Among these compounds, tetrahydrofuran, dimethoxyethane, tetramethylethylenediamine, and diazabicyclo[2,2,2]octane are particularly preferred. They can be used singly or in a combination of two or more types.

Although the amount of electron-donating compound added depends on the type of initiator and the type of electron-donating compound, it is 0.1 to 100 mol relative to 1 mol of the initiator, preferably 0.2 to 50 mol, and more preferably 0.3 to 10 mol. When the amount thereof added is too small, the activation effect cannot be obtained, and when the amount thereof added is too large, the electron-donating compound is only wasted undesirably without enhancing the activation effect. However, when the electron-donating compound is used as a solvent, this does not always apply.

The styrene polymer of the present invention can be synthesized by a solution polymerization method or a bulk polymerization method. The solvent used for synthesis by solution polymerization is not particularly limited as long as it can dissolve the polymer and does not deactivate the active ends during polymerization. Preferred examples include C4–12 aliphatic hydrocarbons such as butane, n-pentane, n-hexane, and n-heptane; C4–12 alicyclic hydrocarbons such as cyclobutane, cyclopentane, methylcyclopentane, cyclohexane, methylcyclohexane, cycloheptane, cyclooctane, and decalin; C6–12 aromatic hydrocarbons such as benzene, toluene, xylene, mesitylene, ethylbenzene, diethylbenzene, cumene, tetralin, and naphthalene; and C4–12 ethers such as diethyl ether, tetrahydrofuran, and methyl t-butyl ether. Among these solvents, the aliphatic hydrocarbons, the alicyclic hydrocarbons, and the ethers are preferred, and cyclohexane, methylcyclohexane, and methyl t-butyl ether are particularly preferred.

Although the polymerization reaction conditions depend on the polymerization method, etc. and cannot be particularly limited, the reaction temperature is usually −100° C. to 200° C., preferably −80° C. to 150° C., and more preferably −50° C. to 100° C. The reaction time is usually 5 minutes to 20 hours, preferably 10 minutes to 15 hours, and more preferably 20 minutes to 10 hours. In the case where an anionic polymerization method is employed, since the active ends can be very susceptible to water, oxygen, etc. during polymerization, it is preferably carried out under an atmosphere of an inert gas such as nitrogen or argon while sufficiently dehydrating the reagents, the solvent, and the inert gas.

Further adding a coupling agent to the styrene polymer obtained by the above-mentioned method enables a styrene polymer to be synthesized in which styrene polymers are bonded in a chain manner or a star-shaped branched manner. Examples of the coupling agent used here include halosilanes such as dimethyldichlorosilane, methyltrichlorosilane, tetrachlorosilane, and tetrabromosilane, alkoxysilanes and aryloxysilanes such as dimethyldimethoxysilane, methyltrimethoxysilane, tetramethoxysilane, bis(trimethoxysilyl)methane, bis(trimethoxysilyl)ethane, dimethyldiethoxysilane, methyltriethoxysilane, tetraethoxysilane, bis(triethoxysilyl)methane, bis(triethoxysilyl)ethane, and tetraphenoxysilane, halides such as α, α'-dichloroxylene, α, α'-dibromoxylene, tetrakis(chloromethyl)benzene, and tetrakis(bromomethyl)benzene, and esters such as dimethyl oxalate, dimethyl succinate, dimethyl glutarate, dimethyl phthalate, and dimethyl terephthalate.

Such a styrene polymer is subjected to a hydrogenation reaction in the presence of a hydrogenation catalyst so as to hydrogenate the aromatic rings and the carbon-carbon double bonds contained in the polymer, thereby giving a hydrogenated styrene polymer.

The hydrogenation catalyst used in the hydrogenation reaction is not particularly limited, and a known catalyst that can hydrogenate the rings of an aromatic ring and a carbon-carbon double bond can be used. Specific examples include solid catalysts in which a noble metal such as nickel, palladium, platinum, cobalt, ruthenium, or rhodium, or a compound such as an oxide thereof, a salt thereof, or a complex thereof, is supported on a porous support such as carbon, alumina, silica, silica-alumina, or diatomaceous earth.

Among these catalysts, those in which nickel, palladium, or platinum is supported on alumina, silica, silica-alumina, or diatomaceous earth are preferably used because of their high activity. Such a hydrogenation catalyst is preferably used in the range of 0.5 to 40 wt % relative to the styrene polymer, although it depends on the catalytic activity.

The hydrogenation reaction is usually carried out in the presence of a solvent. The hydrogenation reaction may be carried out after isolating the polymer from the polymerization reaction, but when the polymerization is carried out by the solution polymerization method, the hydrogenation reaction may be carried out using the polymerization solution as it is or by adding a further necessary solvent. Such a solvent is preferably selected while taking into consideration the function of the hydrogenation catalyst, the presence of side reactions such as molecular chain cleavage, the solubility of the polymer before and after the hydrogenation reaction, etc., and specific examples thereof include C4–C12 aliphatic hydrocarbons such as butane, n-pentane, n-hexane, and n-heptane; C4–C12 alicyclic hydrocarbons such as cyclobutane, cyclopentane, methylcyclopentane, cyclohexane, methylcyclohexane, cycloheptane, cyclooctane, and decalin; and C4–C12 ethers such as diethyl ether, tetrahydrofuran, and methyl t-butyl ether.

Among these solvents, cyclohexane, methylcyclohexane, and methyl t-butyl ether are particularly preferred, depending on the type of catalyst. In order to increase the reaction activity or prevent the molecular weight from being reduced by molecular chain cleavage due to hydrogenolysis, a polar solvent such as an ester or an alcohol may be added to the above-mentioned solvent in a range that does not interfere with the solubility of the polymer.

The hydrogenation reaction is preferably carried out such that the concentration of the styrene polymer used in the reaction is in the range of 3 to 50 wt %. When the concentration of the polymer is less than 3 wt %, it is undesirable from the viewpoint of productivity and economy, and when it is 50 wt % or more, the viscosity of the solution is too high, and it is undesirable from the viewpoint of handling and reactivity.

With regard to the hydrogenation reaction conditions, the reaction is usually carried out at a hydrogen pressure of 3 to 25 MPa and a reaction temperature of 70° C. to 250° C. When the reaction temperature is too low, it is difficult for the reaction to proceed, and when the reaction temperature is too high, the molecular weight is easily decreased by cleavage of the molecular chains. In order to prevent the molecular weight from being decreased by cleavage of the molecular chains and make the reaction proceed smoothly, it is preferable to carry out the hydrogenation reaction at an appropriate temperature and an appropriate hydrogen pressure that are determined according to the type and the concentration of the catalyst used, the solution concentration of the polymer, the molecular weight, etc.

The conditions of such a hydrogenation reaction are preferably such that the degree of hydrogenation of the aromatic rings in the styrene polymer is at least 80%. When the degree of hydrogenation is less than 80%, it tends to become difficult to obtain sufficient heat resistance and transparency for the hydrogenated styrene polymer used in the present invention. The degree of hydrogenation of the aromatic rings in the styrene polymer is preferably at least 90%, and more preferably at least 99%.

The reaction mixture thus obtained is subjected to centrifugation, mechanical filtration, filtration using a filter having a charge trapping function, a liquid cyclone, etc. to remove the majority of the catalyst.

In the present invention, the solution of the hydrogenated styrene polymer thus obtained is preferably filtered using a filter having a pore size of at most 0.3 μm at a temperature at which the viscosity of the solution is at most 10 Pa·sec (100 poise) at a shear rate of 1 (1/s). With regard to the pore size of the filter used, the smaller the better, and it is preferably at most 0.2 μm, and more preferably at most 0.1 μm. With regard to the solution of the hydrogenated styrene polymer used for filtration, it is preferable to carry out filtration at a temperature at which the viscosity after filtration is at most 10 Pa·sec (100 poise) at a shear rate of 1 (1/s). When the viscosity exceeds 10 Pa·sec (100 poise), it takes too long to filter and the load on the filter is too large, which is undesirable. The viscosity is more preferably at most 5 Pa·sec (50 poise), and yet more preferably at most 2 Pa·sec (20 poise). The concentration of the polymer in the polymer solution greatly depends on the degree of polymerization, but it is approximately 1 wt % to 40 wt %. The temperature at which the filtration is carried out is a temperature at which the viscosity after filtration is at most 10 Pa·sec (100 poise) at a shear rate of 1 (1/s), but it is carried out in general in the range of 10° C. to 200° C. The pressure at which the filtration is carried out is preferably in the range of 0.105 MPa to 2.0 MPa. If the pressure is less than 0.105 MPa, then the filtration takes too long, which is undesirable, and if the pressure is higher than 2.0 MPa, then the load on the filter is too large, which is undesirable. The pressure is more preferably 0.15 MPa to 1.0 MPa, and yet more preferably 0.2 MPa to 0.4 MPa.

In the solution obtained after the filtration, the residual catalyst metal and the compounds of metals of group I and II in the periodic table originating from the initiator are preferably present at no more than the above-mentioned contents, but if such a metal and a metal compound are present at contents exceeding the upper limits, it is preferable to carry out an operation to remove the metal components.

With regard to a method for removing the metal components, there can be cited as examples a method in which the metal components are removed by bringing the solution of the hydrogenated styrene polymer into contact with an incompatible solvent, and a method in which they are removed using an adsorbent.

When the metal components are removed by contact with an incompatible solvent, examples of the incompatible solvent include water and an alcoholic solvent such as methanol. In this case, the incompatible solvent and the solution of the hydrogenated styrene polymer are stirred well, and after the metal components move to the incompatible solvent side, the liquid phases are separated.

When an adsorbent is used, it is possible to use a powder or particles that can easily adsorb the residual metal components and are substantially unable to dissolve in the solution of the hydrogenated styrene polymer. Examples of the adsorbent that can be suitably used in such a case include diatomaceous earth, silicic acid, a clay mineral, a metal hydroxide, a hydrated metal oxide, a metal salt, cellulose, perlite, bentonite, zeolite, alumina, silica, silica-alumina, an ion-exchange resin, and carbon. Among these adsorbents, those having a large surface area per unit weight (specific surface area) are preferably used from the viewpoint of the adsorptivity for the metal components. The specific surface area is preferably at least 30 $m^2/g$, more preferably at least 50 $m^2/g$, and yet more preferably at least 100 $m^2/g$. From the viewpoint of a practical adsorbent, the specific surface area is preferably at most 1000 $m^2/g$, more preferably at most 800 $m^2/g$, and yet more preferably at most 600 $m^2/g$.

In the case where treatment is carried out using an adsorbent, although it is necessary to carry out filtration again, the aforementioned filtration conditions can be employed without modification.

With regard to the solution thus obtained after filtration, the solvent can be removed by heating the polymer at a reduced pressure. Since the hydrogenated styrene polymer is easily degraded by such heating, it is preferable to dissolve a thermal stabilizer, which will be described later, in advance in the polymer solution.

After filtration, the solvent is removed by evaporation or steam stripping. In particular, as a method for removing the solvent, it is possible to employ a thin film evaporation method using an 'Exeva' manufactured by Shinko Pantec Co., Ltd., etc. or a direct solvent removal method employing a vent-equipped twin screw extruder, etc. The hydrogenated styrene polymer obtained after removing the solvent is preferably handled in an environment having extremely low levels of foreign matter, such as in a clean room, in order to prevent contamination by foreign matter of external origin.

Furthermore, in the present invention, prior to carrying out removal of the solvent as described above, it is preferable to add a stabilizer to the solution of the hydrogenated styrene polymer. Examples of such a stabilizer include standard hindered phenol types such as Irganox 1010, 1076 (manufactured by Ciba Specialty Chemicals), benzofuranone types such as HP136 (manufactured by Ciba Specialty Chemicals), and partially acrylated hindered phenol types represented by formula (I) below, and they can be used in combination. Among these stabilizers, it is preferable to use a partially acrylated hindered phenol type stabilizer represented by formula (I) below, from the viewpoint of preventing a reduction in the degree of polymerization of the hydrogenated styrene polymer and preventing crazing spots from being generated in a hot and humid environment.

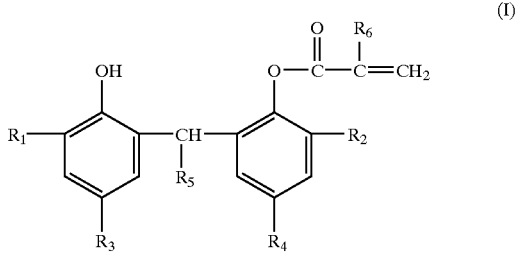

(In the formula, $R_1$ to $R_5$ are identical to or different from each other and denote hydrogen atoms or alkyl groups having 1 to 10 carbons, and $R_6$ denotes a hydrogen atom or a methyl group.)

The alkyl groups in the compound represented by formula (I) above are selected while taking into consideration the effect as a stabilizer and the ease of production. Specific examples of the alkyl groups having 1 to 10 carbons for $R_1$ to $R_5$ include methyl, ethyl, n-propyl, isopropyl, n-butyl, sec-butyl, isobutyl, tert-butyl, and 1,1-dimethylpropyl. In particular, $R_1$ and $R_2$ are preferably bulky alkyl groups having large steric hindrance, such as isopropyl, sec-butyl, tert-butyl, and 1,1-dimethylpropyl, from the viewpoint of the stabilization effect and ease of production. $R_3$ and $R_4$ are preferably tert-butyl, or 1,1-dimethylpropyl when taking into consideration the prevention of a reaction that generates a quinoid structure accompanying the abstraction of hydrogen. $R_5$ is preferably methyl, ethyl, n-propyl, or n-butyl. Specific examples of such a compound include one with the product name 'Sumilizer (Smilizer) GM' manufactured by Sumitomo Chemical Co., Ltd. (in the above-mentioned formula (I), $R_1=R_2=$tert-butyl, $R_3=R_4=$methyl, and $R_5=R_6=$hydrogen) and one with the product name 'Sumilizer (Smilizer) GS' (in the above-mentioned formula (I), $R_1=R_2=R_3=R_4=$1,1-dimethylpropyl, $R_5=$methyl, and $R_6=$hydrogen).

The amount of such a stabilizer added is preferably adjusted such that at least 0.01 parts by weight and at most 5 parts by weight thereof remains relative to 100 parts by weight of the hydrogenated styrene polymer. When the amount thereof remaining in the hydrogenated styrene polymer is less than 0.01 parts by weight, the degree of polymerization of the hydrogenated styrene polymer decreases markedly, and it is difficult to obtain a molding having desired physical properties. When the amount thereof remaining in the hydrogenated styrene polymer exceeds 5 parts by weight, it causes mold contamination during molding and coloration of the molding. Since the stabilizer contributes to thermal stability while forming a molding of the present invention, it is preferable for it to be in the above-mentioned range. The range of the amount thereof remaining in the hydrogenated styrene polymer is more preferably at least 0.05 parts by weight and at most 3 parts by weight, and yet more preferably at least 0.1 parts by weight and at most 2 parts by weight.

Such a stabilizer is partially lost in the step for removing a solvent used in the above-mentioned hydrogenation reaction. The proportion of stabilizer remaining greatly depends on the conditions of the solvent removal, but in order to realize the above-mentioned amount thereof remaining in the hydrogenated styrene polymer, it is usually necessary to add an amount that is on the order of 1.1 times to 3 times the desired residual amount of the stabilizer to the solution of the hydrogenated styrene polymer.

It is also possible to add, as necessary, an additive such as an ester-based mold-release agent, for example, glycerol monostearate, a silicon-based mold-release agent, for example, dimethylsiloxane, a lubricant, a plasticizer, a UV absorber, a coloring agent, or an antistatic agent.

The optical disk substrate, which is a molding of the present invention, is an optical disk substrate substantially formed from the above-mentioned hydrogenated styrene polymer, and the number of crazing spots contained in 1 $cm^2$ at any position on the substrate surface after exposing the optical disk substrate to an atmosphere with a temperature of 80° C. and a relative humidity of 85% for 500 hours is at most 10, and preferably at most 5.

The number of crazing spots is counted by microscopy using an optical microscope having a magnification of 50 times, measurement is carried out three times for each substrate, and an average value is obtained.

An information recording medium using an optical disk substrate having very few crazing spots can store and reproduce information well at high temperature and high humidity, and can be used as the substrate for various types of optical disks such as CD, MO, MD, and DVD.

A molding can be obtained by melt molding the hydrogenated styrene polymer of the present invention.

The hydrogenated styrene polymer of the present invention can be easily molded by a conventionally known injection molding or injection compression molding method into an optical component such as an optical disk substrate, a food or medical container, a film, an electric/electronic member, etc.

The cylinder temperature during molding of the hydrogenated styrene polymer of the present invention depends on the intended use, but is preferably in the range of 250° C. to 350° C. If it is 250° C. or less, then the flowability degrades and it is difficult to obtain a good molding, and if it is 350° C. or more, then the heat resistance of the resin decreases and thermal decomposition undesirably occurs. The cylinder temperature is preferably at least 280° C. and at most 340° C. The mold temperature during molding is preferably 70° C. to 150° C. If it is 70° C. or less, then the surface replication of the molding deteriorate, and if it is 150° C. or more, since it is in the vicinity of the glass transition temperature of the polymer, the molding tends to deform easily when being removed. The mold temperature is preferably at least 80° C. and at most 140° C.

Since the hydrogenated styrene polymer of the present invention has excellent durability in a hot and humid environment and has stability at high temperature and high humidity and, in particular, the generation of crazing, which causes degradation in the transparency, is suppressed, it can be suitably used in the formation of a molding, for example, an optical component such as an optical disk substrate, a food or medical container, a film, or an electric/electronic member.

EXAMPLES

The present invention is now explained in detail by reference to examples. However, the present invention is not limited by these examples.

Measurements in the examples and comparative examples were carried out by the methods below.

Solution viscosity: viscosity was measured at 30° C. using a B type viscometer.

Degree of hydrogenation, styrene/isoprene ratio by weight in hydrogenated copolymer: quantified by $^1$H-NMR. A model JNM-A-400 NMR spectrometer manufactured by JEOL was used.

Glass transition temperature (Tg): measured using a model 2920 DSC manufactured by TA Instruments at a rate of temperature increase of 20° C./min.

Reduced viscosity: the reduced viscosity η sp/C at 30° C. was measured as a 0.5 g/dL toluene solution.

Residual inorganic element concentration: quantified by ICP emission spectroscopy.

Measurement of foreign matter: measured using a KL-26 particle counter manufactured by Rion Co., Ltd.

Total light transmittance: a UV-240 UV-VIS spectrometer manufactured by Shimadzu Corporation was used. The wavelength dispersion of the transmittance from 380 nm to 780 nm was measured, the visibility was corrected according to a standard visibility V (λ) determined at every 10 nm by the International Commission on Illumination (CIE), and the value thus obtained was defined as the total light transmittance.

Measurement of water absorption: the water absorption after immersion in water at 23° C. for 24 hours was measured according to 'Plastics—Determination of Water Absorption' described in JIS K7209.

Example 1

The interior of a 10L stainless autoclave equipped with a stirrer blade was dried well, flushed with nitrogen, and then charged with 750 g of a polystyrene (Mw=2.8×10$^5$), 118 g of a Ni/silica-alumina catalyst, 2,200 g of cyclohexane, and 1,500 g of methyl tert-butyl ether. This reactor was then flushed well with hydrogen, and a hydrogenation reaction was carried out at 180° C. for 6 hours while stirring under a hydrogen pressure of 100 kgf/cm$^2$ (9.8 MPa). After the reaction was completed, the suspension (slurry) thus obtained was filtered using a membrane filter having a pore diameter of 0.1 μm ('Fluoropore' manufactured by Sumitomo Electric Industries, Ltd.) at 30° C. under a pressure of 0.6 MPa to give a transparent, colorless solution (solution A). The solution viscosity of this solution was 0.14 Pa sec (1.4 poise).

To this filtrate was added 0.4 wt %, relative to the hydrogenated styrene polymer, of 'Sumilizer GS' (in the above-mentioned formula (I), $R_1=R_2=R_3=R_4=1,1$-dimethylpropyl, $R_5$=methyl, and $R_6$=hydrogen). This solution was heated in a sealed system such that the solution was not contaminated by external foreign matter, and evacuated so as to remove the solvent, and it was then pelletized using an extruder having its discharge outlet within a clean room to give a transparent, colorless polymer.

The polymer thus obtained was used to prepare a 1 wt % toluene solution, the foreign matter content was measured, and it was found that there were 6.5×10$^4$ particles, per g of the polymer, of foreign matter having a size of 0.2 μm or more and less than 0.5μm, and 8.3×10$^3$ particles, per g of the polymer, of foreign matter having a size of 0.5 μm or more.

The degree of hydrogenation of this polymer was quantitatively determined by $^1$H-NMR and was 99.3%. The reduced viscosity η sp/C at 30° C. obtained using a 0.5 g/dL toluene solution thereof was 0.47 dL/g. The residual metal in the polymer obtained by ICP emission spectroscopy was 0.23 ppm for Ni, 0.30 ppm for Al, 0.19 ppm for Si, and 15 ppb for Li, none of which exceeded 1 ppm. The concentration of phosphorus did not exceed 0.1 ppm. The glass transition temperature measured by DSC was 149° C.

Granules for molding were then prepared using the hydrogenated styrene polymer. The granules thus obtained were subjected to injection molding using a stamper for a blue laser at a resin temperature of 330° C. and a mold temperature of 120° C. to give a transparent, colorless optical disk substrate (diameter: 12 cm, thickness: 0.6 mm). The water absorption of this optical disk substrate was 0.01% or less, which was extremely low, and the total light transmittance was 91%, which indicated high transparency.

After the optical disk substrate had been subjected to accelerated degradation in an 80° C. and 85% RH atmosphere for 500 hours, the number of crazing spots were counted by inspection using a microscope. The result was that the number of crazing spots within the substrate was 1 per cm$^2$.

Comparative Example 1

To the transparent, colorless solution (solution A) obtained after filtration in Example 1 were added 0.4 wt %, relative to the polymer, of each of 'Irganox 1010 (hindered phenol type)' (manufactured by Ciba Specialty Chemicals) and 'Irgafos 168 (phosphine type)' (manufactured by Ciba Specialty Chemicals). This solution was heated in a sealed system such that the solution was not contaminated by external foreign matter, and evacuated so as to remove the solvent, and it was then pelletized using an extruder having its discharge outlet within a clean room to give a transparent, colorless polymer.

The polymer thus obtained was used to prepare a 1 wt % toluene solution, the foreign matter content was measured, and it was found that there were 5.8×10$^4$ particles, per g of the polymer, of foreign matter having a size of 0.2 μm or more and less than 0.5 μm, and 9.5×10$^3$ particles, per g of the polymer, of foreign matter having a size of 0.5 μm or more.

The degree of hydrogenation of this polymer was quantitatively determined by $^1$H-NMR and was 99.3%.

The reduced viscosity η sp/C at 30° C. obtained using a 0.5 g/dL toluene solution thereof was 0.47 dL/g. The residual metal in the polymer obtained by ICP emission spectroscopy was 0.25 ppm for Ni, 0.38 ppm for Al, 0.53 ppm for Si, and 18 ppb for Li, none of which exceeded 1 ppm. However, the concentration of phosphorus was 180 ppm. The glass transition temperature measured by DSC was 149° C.

In the same manner as in Example 1, injection molding was carried out using a stamper for a blue laser at a resin temperature of 330° C. and a mold temperature of 120° C. to give a transparent, colorless optical disk substrate (diameter: 12 cm, thickness: 0.6 mm). The water absorption of this optical disk substrate was 0.01% or less, which was extremely low, and the total light transmittance was 91%, which indicated high transparency.

After the optical disk substrate had been subjected to accelerated degradation in an 80° C. and 85% RH atmosphere for 500 hours, the number of crazing spots were counted by inspection using a microscope. The result was that the number of crazing spots within the substrate was 100 or more per cm$^2$.

Comparative Example 2

The interior of a 10L stainless autoclave equipped with a stirrer blade was dried well, flushed with nitrogen, and then charged with 750 g of a polystyrene (Mw=2.8×10$^5$), 120 g of a Ni/silica-alumina catalyst, 2,200 g of cyclohexane, and 1,500 g of methyl tert-butyl ether. This reactor was then flushed well with hydrogen, and a hydrogenation reaction was carried out at 180° C. for 6 hours while stirring under a hydrogen pressure of 100 kgf/cm$^2$ (9.8 MPa). After the reaction was completed, the suspension (slurry) thus obtained was filtered using a membrane filter having a pore diameter of 0.5 μm ('Fluoropore' manufactured by Sumitomo Electric Industries, Ltd.) at 30° C. under a pressure of 0.6 MPa to give a transparent, colorless solution (solution A). The solution viscosity of this solution was 0.14 Pa·sec (1.4 poise).

To this filtrate was added 0.4 wt %, relative to the hydrogenated styrene polymer, of 'Sumilizer GS'. This solution was heated in a sealed system such that the solution was not contaminated by external foreign matter, and evacuated so as to remove the solvent, and it was then pelletized using an extruder having its discharge outlet within a clean room to give a transparent, colorless polymer.

The polymer thus obtained was used to prepare a 0.05 wt % toluene solution, the foreign matter content was measured, and it was found that there were $3.2 \times 10^6$ particles, per g of the polymer, of foreign matter having a size of 0.2 μm or more and less than 0.5 μm, and $4.7 \times 10^4$ particles, per g of the polymer, of foreign matter having a size of 0.5 μm or more.

The degree of hydrogenation of this polymer was quantitatively determined by $^1$H-NMR and was 99.5%. The reduced viscosity η sp/C at 30° C. obtained using a 0.5 g/dL toluene solution thereof was 0.46 dL/g. The residual metal in the polymer obtained by ICP emission spectroscopy was 0.71 ppm for Ni, 0.89 ppm for Al, 1.8 ppm for Si, and 82 ppb for Li. The concentration of phosphorus did not exceed 0.1 ppm. The glass transition temperature measured by DSC was 149° C.

Granules for molding were then prepared using the hydrogenated styrene polymer. The granules thus obtained were subjected to injection molding using a stamper for a blue laser at a resin temperature of 330° C. and a mold temperature of 120° C. to give a transparent, colorless optical disk substrate (diameter: 12 cm, thickness: 0.6 mm). The water absorption of this optical disk substrate was 0.01% or less, which was extremely low, and the total light transmittance was 91%, which indicated high transparency.

After the optical disk substrate had been subjected to accelerated degradation in an 80° C. and 85% RH atmosphere for 500 hours, the number of crazing spots were counted by inspection using a microscope. The result was that the number of crazing spots within the substrate was 100 or more per cm².

Example 2

The interior of a 10L stainless autoclave equipped with a stirrer blade was dried well, flushed with nitrogen, and then charged with 2,400 g of cyclohexane, 1,600 g of methyl tert-butyl ether, and 720 g of styrene. An amount of a 1.57 M cyclohexane solution of n-butyllithium corresponding to 16.2 mmol thereof was then added to initiate polymerization. The styrene was polymerized while stirring at a temperature of 30° C. for 1.5 hours. 80 g of isoprene was then added and reacted at 30° C. for 1.5 hours. An amount of a 3.0 wt % cyclohexane solution of tetramethoxysilane corresponding to 0.54 g thereof was then added, and the temperature was raised to 60° C. to carry out a coupling reaction. 3 hours after the coupling reaction was started, 10 mL of ethanol was added. To this copolymer solution was added 140 g of a Ni/silica-alumina catalyst (proportion of Ni supported: 65 wt %) and a hydrogenation reaction was carried out under a hydrogen pressure of 100 kgf/cm² (9.8 MPa)) at a temperature of 180° C. for 6 hours. After returning it to room temperature and flushing well with nitrogen, the suspension thus obtained was taken out of the autoclave and subjected to pressure filtration using a membrane filter having a pore diameter of 0.1 μm ('Fluoropore' manufactured by Sumitomo Electric Industries, Ltd.) at 30° C. under a pressure of 0.6 MPa to give a transparent, colorless solution. The solution viscosity of this solution was 0.13 Pa·sec (1.3 poise).

To this solution was added 0.4 wt %, relative to the hydrogenated styrene-isoprene copolymer, of 'Sumilizer GM' as a stabilizer. This solution was heated in a sealed system such that the solution was not contaminated by external foreign matter, and evacuated so as to remove the solvent, and it was then pelletized using an extruder having its discharge outlet within a clean room to give a transparent, colorless polymer.

The copolymer thus obtained was used to prepare a 1 wt % toluene solution, the foreign matter content was measured, and it was found that there were $7.3 \times 10^4$ particles, per g of the copolymer, of foreign matter having a size of 0.2 μm or more and less than 0.5 μm, and $8.5 \times 10^3$ particles, per g of the copolymer, of foreign matter having a size of 0.5 μm or more.

The styrene/isoprene ratio by weight of this hydrogenated copolymer was determined by $^1$H-NMR and was 90.2/9.8, and the degree of hydrogenation was 99.3%.

The reduced viscosity η sp/C at 30° C. obtained using a 0.5 g/dL toluene solution of the copolymer thus obtained was 0.44 dL/g. The residual metal in the copolymer obtained by ICP emission spectroscopy was 0.25 ppm for Ni, 0.12 ppm for Al, and 20 ppb for Li. The concentration of phosphorus did not exceed 0.1 ppm. The glass transition temperature measured by DSC was 147° C.

In the same manner as in Example 1, injection molding was carried out using a stamper for a blue laser at a resin temperature of 330° C. and a mold temperature of 120° C. to give a transparent, colorless optical disk substrate (diameter: 12 cm, thickness: 0.6 mm). The water absorption of this optical disk substrate was 0.01% or less, which was extremely low, and the total light transmittance was 91%, which indicated high transparency.

After the optical disk substrate had been subjected to accelerated degradation in an 80° C. and 85% RH atmosphere for 500 hours, the number of crazing spots were counted by inspection using a microscope. The result was that the number of crazing spots within the substrate was 2 per cm².

Example 3

The suspension obtained by the hydrogenation reaction in Example 2 was filtered using a membrane filter having a pore diameter of 0.1 μm ('Fluoropore' manufactured by Sumitomo Electric Industries, Ltd.) at 30° C. under a pressure of 0.25 MPa to give a transparent, colorless solution. The solution viscosity of this solution was 0.13 Pa·sec (1.3 poise).

To this solution was added 0.4 wt %, relative to the hydrogenated styrene-isoprene copolymer, of Sumilizer GM as a stabilizer. This solution was heated in a sealed system such that the solution was not contaminated by external foreign matter, and evacuated so as to remove the solvent, and it was then pelletized using an extruder having its discharge outlet within a clean room to give a transparent, colorless polymer.

The copolymer thus obtained was used to prepare a 1 wt % toluene solution, the foreign matter content was measured, and it was found that there were $4.3 \times 10^3$ particles, per g of the copolymer, of foreign matter having a size of 0.2 μm or more and less than 0.5 μm, and 4.0 ×10² particles, per g of the copolymer, of foreign matter having a size of 0.5 μm or more.

The styrene/isoprene ratio by weight of this hydrogenated copolymer was determined by ¹H-NMR and was 90.2/9.8, and the degree of hydrogenation was 99.3%. The reduced viscosity η sp/C at 30° C. obtained using a 0.5 g/dL toluene solution of the copolymer was 0.44 dL/g. The residual metal in the copolymer obtained by ICP emission spectroscopy was 0.18 ppm for Ni, 0.10 ppm for Al, and 25 ppb for Li. The concentration of phosphorus did not exceed 0.1 ppm. The glass transition temperature measured by DSC was 147° C.

In the same manner as in Example 1, injection molding was carried out using a stamper for a blue laser at a resin temperature of 330° C. and a mold temperature of 120° C. to give a transparent, colorless optical disk substrate (diameter: 12 cm, thickness: 0.6 mm). The water absorption of this optical disk substrate was 0.01% or less, which was extremely low, and the total light transmittance was 91%, which indicated high transparency.

After the optical disk substrate had been subjected to accelerated degradation in an 80° C. and 85% RH atmosphere for 500 hours, the number of crazing spots were counted by inspection using a microscope. The result was that the number of crazing spots within the substrate was 0 per cm².

Example 4

A stainless autoclave dried well and flushed with nitrogen was charged with 266 g of styrene and 2,500 g of cyclohexane. After the solution had been heated to 40° C., 3.5 mL of a 1.0 M hexane solution of n-butyllithium was added thereto, it was heated to 50° C. and reacted for 2 hours. 60 g of isoprene was then added as a cyclohexane solution and reacted for a further 2 hours. 266 g of styrene and 700 g of cyclohexane were then added and reacted for a further 2 hours. After the reaction was completed, 0.7 g of isopropanol was added to give a styrene-isoprene-styrene block copolymer. The average molecular weight obtained by GPC was 107,000, and the molecular weight distribution was 1.45.

To this solution were added 1,300 g of cyclohexane, 700 g of methyl t-butyl ether, and 80 g of nickel/silica-alumina, and a hydrogenation reaction was carried out under a hydrogen pressure of 10 MPa at a temperature of 180° C. for 4 hours. After returning it to room temperature and flushing well with nitrogen, the suspension thus obtained was taken out of the autoclave and subjected to filtration using a membrane filter having a pore diameter of 0.1 μm ('Fluoropore' manufactured by Sumitomo Electric Industries, Ltd.) at 30° C. under a pressure of 0.6 MPa to give a transparent, colorless solution. The solution viscosity of this solution was 0.13 Pa·sec (1.3 poise).

To this solution was added 0.4 wt %, relative to the hydrogenated styrene-isoprene-styrene block copolymer, of 'Sumilizer GM' as a stabilizer. This solution was heated in a sealed system such that the solution was not contaminated by external foreign matter, and evacuated so as to remove the solvent, and it was then pelletized using an extruder having its discharge outlet within a clean room to give a transparent, colorless copolymer.

The copolymer thus obtained was used to prepare a 1 wt % toluene solution, the foreign matter content was measured, and it was found that there were 8.4×10⁴ particles, per g of the copolymer, of foreign matter having a size of 0.2 μm or more and less than 0.5 μm, and 9.6 ×10³ particles, per g of the copolymer, of foreign matter having a size of 0.5 μm or more.

The styrene/isoprene ratio by weight of this hydrogenated copolymer was determined by ¹H-NMR and was 90.0/10.0, and the degree of hydrogenation was 99.5%.

The reduced viscosity η sp/C at 30° C. obtained using a 0.5 g/dL toluene solution of the copolymer thus obtained was 0.42 dL/g. The residual metal in the copolymer obtained by ICP emission spectroscopy was 0.29 ppm for Ni, 0.32 ppm for Al, 0.42 ppm for Si, and 18 ppb for Li. The concentration of phosphorus did not exceed 0.1 ppm. The glass transition temperature measured by DSC was 145° C.

In the same manner as in Example 1, injection molding was carried out using a stamper for a blue laser at a resin temperature of 330° C. and a mold temperature of 120° C. to give a transparent, colorless optical disk substrate (diameter: 12 cm, thickness: 0.6 mm). The water absorption of this optical disk substrate was 0.01% or less, which was extremely low, and the total light transmittance was 91%, which indicated high transparency.

After the optical disk substrate had been subjected to accelerated degradation in an 80° C. and 85% RH atmosphere for 500 hours, the number of crazing spots were counted by inspection using a microscope. The result was that the number of crazing spots within the substrate was 0 per cm².

What is claimed is:

1. A hydrogenated styrene polymer having a hydrogenated polymerized styrene unit content of at least 70 wt %, the polymer comprising:
    a content of fine particulate foreign matter having a particle size of 0.2 μm or more and less than 0.5 μm of at most 1×10⁶ particles per g of the hydrogenated styrene polymer; and
    a phosphorus atom content of at most 0.01 parts by weight in 100 parts by weight of the hydrogenated styrene polymer.

2. The hydrogenated styrene polymer according to claim 1 wherein it further comprises at least 1 wt % and at most 30 wt % of a hydrogenated conjugated diene polymer component as a copolymerized component.

3. A molding obtained by melt molding of the hydrogenated styrene polymer according to claim 1.

4. A process for producing a hydrogenated styrene polymer as claimed in claim 1 comprising: filtering, with a filter having a pore size of 0.3 μm or less, a hydrogenated styrene polymer having a hydrogenated polymerized styrene unit content of at least 70 wt %, at a temperature at which the solution viscosity thereof is at most 10 Pa·sec (100 poise) at a shear rate of 1 (1/s); and then removing a solvent from the filtrate thus obtained.

* * * * *